(12) United States Patent
Villamar

(10) Patent No.: US 6,932,304 B1
(45) Date of Patent: Aug. 23, 2005

(54) WRIST SUPPORT DEVICE

(76) Inventor: Joseph Villamar, 419 W. 17th St. Apt 13 A, New York, NY (US) 10011

(*) Notice: Subject to any disclaimer, the term of this patent is extended or adjusted under 35 U.S.C. 154(b) by 0 days.

(21) Appl. No.: 10/789,596

(22) Filed: Feb. 27, 2004

(51) Int. Cl.$^7$ .............................................. B43L 15/00
(52) U.S. Cl. .................... 248/118.1; 248/918; D14/114
(58) Field of Search ............................ 248/118.1, 918, 248/118, 118.5; D14/114

(56) References Cited

U.S. PATENT DOCUMENTS

| 5,203,845 | A | * | 4/1993 | Moore .......................... 248/118 |
| 5,228,655 | A | * | 7/1993 | Garcia et al. ................ 248/118 |
| 5,340,067 | A | * | 8/1994 | Martin et al. ............. 248/118.5 |
| 5,562,270 | A | * | 10/1996 | Montague .................... 248/118.1 |
| 5,713,544 | A | * | 2/1998 | Wolf et al. .................. 248/118 |
| 5,788,195 | A | * | 8/1998 | Rice .......................... 248/118.5 |
| 5,820,968 | A | * | 10/1998 | Kurani ........................ 428/137 |
| D406,578 | S | * | 3/1999 | Fitzsimmons .............. D14/459 |
| 5,894,302 | A | | 4/1999 | Scenna et al. |
| 6,039,292 | A | * | 3/2000 | Danzyger et al. ........ 248/118.5 |
| 6,050,964 | A | * | 4/2000 | Yates .......................... 248/118 |
| 6,131,862 | A | * | 10/2000 | Gruenenfelder ............. 248/118 |
| 6,219,867 | B1 | * | 4/2001 | Yates .......................... 248/118 |
| 6,300,941 | B1 | | 10/2001 | Segalle |
| 6,402,100 | B1 | * | 6/2002 | Rice ........................... 248/118 |
| 6,491,275 | B1 | * | 12/2002 | Goodman et al. ..... 248/346.01 |
| 6,590,564 | B1 | | 7/2003 | Mcloone et al. |
| 6,616,108 | B1 | * | 9/2003 | Brophy et al. ........... 248/118.1 |
| 6,648,282 | B1 | * | 11/2003 | Sykes ......................... 248/118 |

FOREIGN PATENT DOCUMENTS

JP      10091337 A   *  4/1998
SE       9500696 A   *  8/1996

* cited by examiner

Primary Examiner—Anita M. King

(57) ABSTRACT

A wrist support device for supporting a wrist of a user while the user is using a computer mouse. The wrist support device includes a base member being designed for being selectively coupled to the computer mouse. A cushion member is coupled to the base member whereby the cushion member extends upwardly from the base member. The cushion member is designed for supporting the wrist of the user to reduce the stress on the wrist of the user when a hand of the user is positioned on the computer mouse.

1 Claim, 2 Drawing Sheets

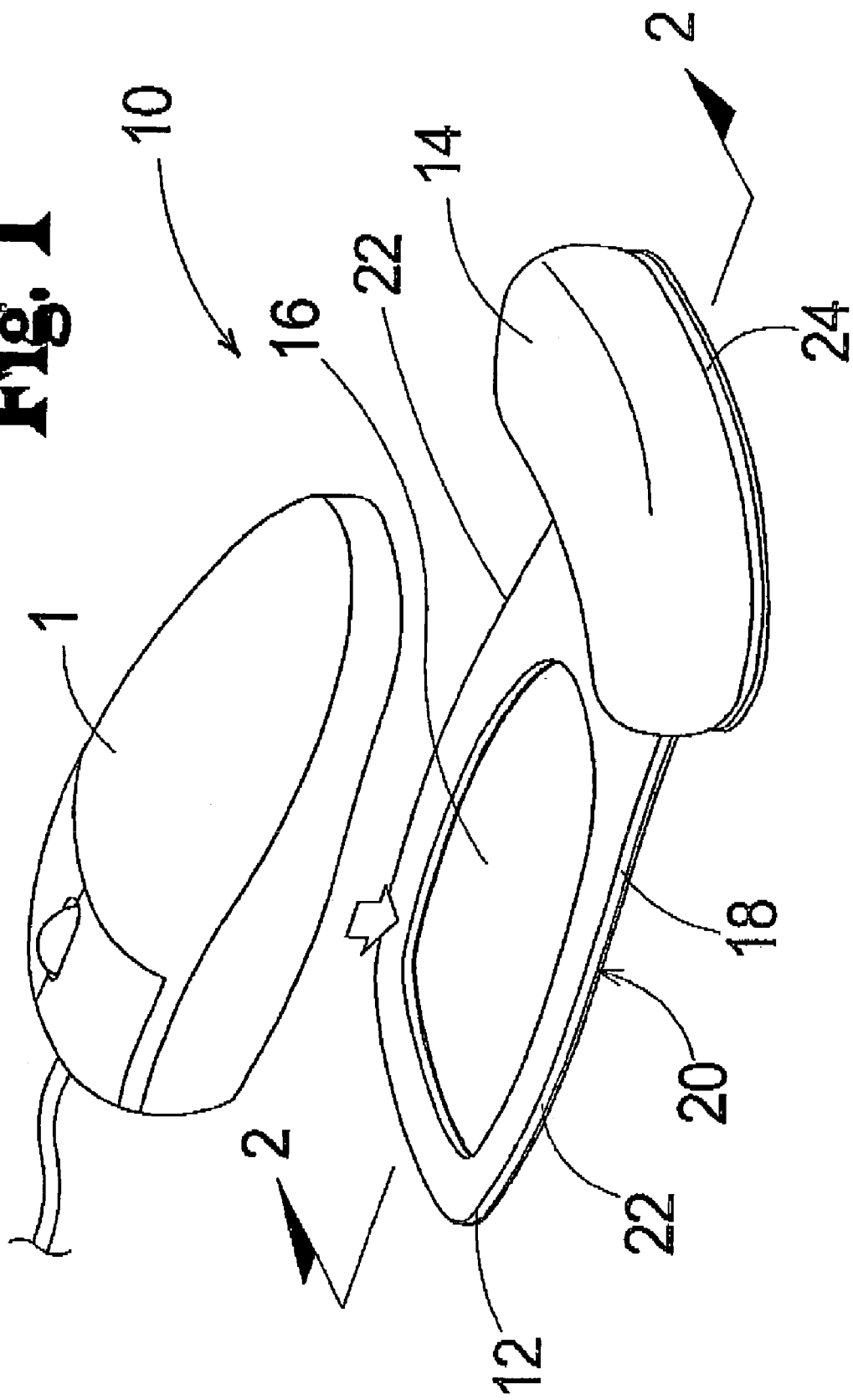

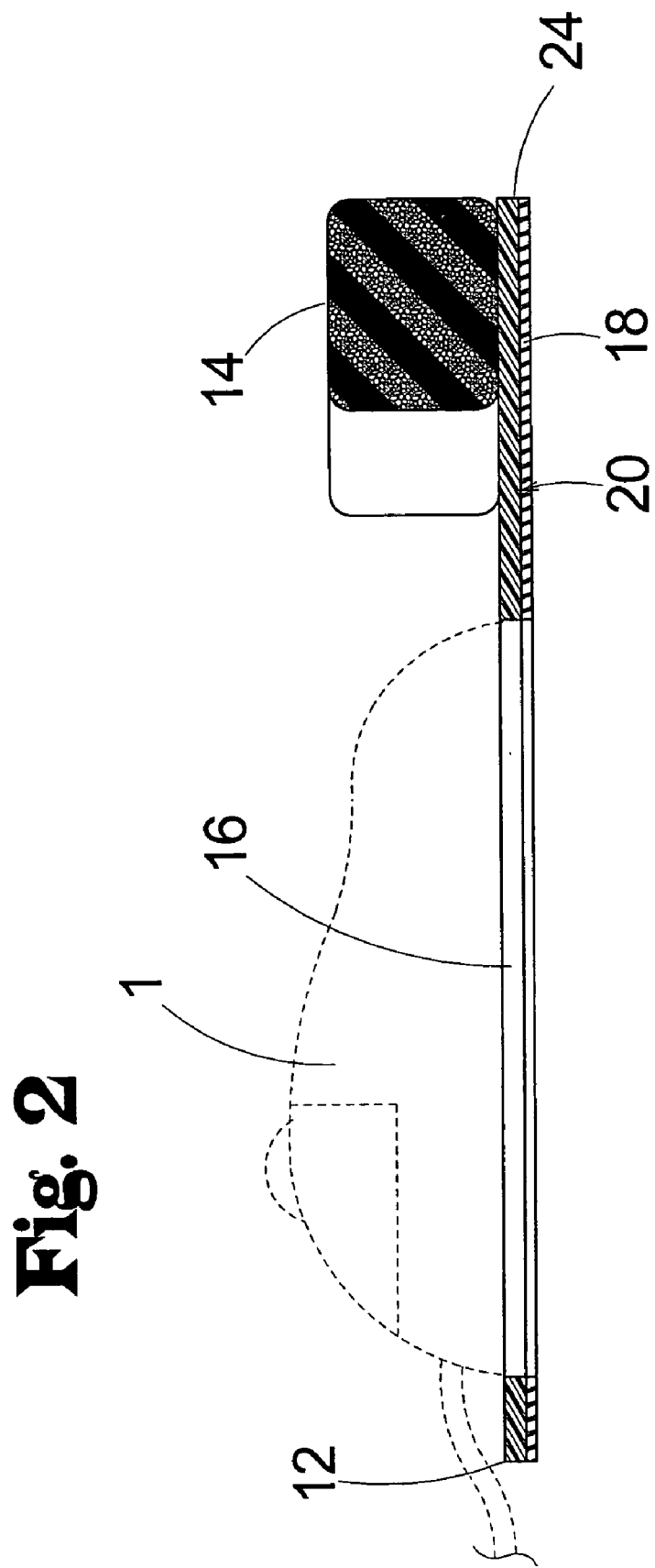

WRIST SUPPORT DEVICE

BACKGROUND OF THE INVENTION

1. Field of the Invention

The present invention relates to ergonomic computer peripherals and more particularly pertains to a new wrist support device for supporting a wrist of a user while the user is using a computer mouse.

2. Description of the Prior Art

The use of ergonomic computer peripherals is known in the prior art. U.S. Pat. No. 6,300,941 describes a device for providing input into a computer that has no adverse effects on the hand of the user when the user is using the device. Another type of ergonomic computer peripheral is U.S. Pat. No. 5,894,302 having a housing for computer mouse that is ergonomic and reduces the occurrence of repetitive strain injuries to the hand of the user. U.S. Pat. No. 6,590,564 has a computer input device that comfortably supports the hand of the user to allow access to all the actuators of the input device while maintaining the hand and arm is a comfortable position.

While these devices fulfill their respective, particular objectives and requirements, the need remains for a device that has certain improved features for supporting the wrist of the user when the user is using a computer mouse.

SUMMARY OF THE INVENTION

The present invention meets the needs presented above by providing a cushion member that extends upwardly from a base member and supports the wrist of the user when the base member is coupled to the computer mouse.

Still yet another object of the present invention is to provide a new wrist support device that supports and reduces the strain on the wrist of a user using a computer mouse for any length of time.

Even still another object of the present invention is to provide a new wrist support device that is easily coupled to the computer mouse and does not impede the use of the computer mouse.

To this end, the present invention generally comprises a base member being designed for being selectively coupled to the computer mouse. A cushion member is coupled to the base member whereby the cushion member extends upwardly from the base member. The cushion member is designed for supporting the wrist of the user to reduce the stress on the wrist of the user when a hand of the user is positioned on the computer mouse.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of a new wrist support device according to the present invention.

FIG. 2 is a cross-sectional view of the present invention taken along line 2—2 of FIG. 1.

DESCRIPTION OF THE PREFERRED EMBODIMENT

With reference now to the drawings, and in particular to FIGS. 1 and 2 thereof, a new wrist support device embodying the principles and concepts of the present invention and generally designated by the reference numeral 10 will be described.

As best illustrated in FIGS. 1 and 2, the wrist support device 10 generally comprises a base member 12 being designed for being selectively coupled to the computer mouse 1.

A cushion member 14 is coupled to the base member 12 whereby the cushion member 14 extends upwardly from the base member 12. The cushion member 14 is designed for supporting the wrist of the user to reduce the stress on the wrist of the user when a hand of the user is positioned on the computer mouse 1.

The base member 12 comprises a receiving aperture 16. The receiving aperture 16 extends through the base member 12. The receiving aperture 16 is designed for receiving the computer mouse 1 whereby the base member 12 extends around a periphery of a lower portion of the computer mouse 1. The base member 12 is designed for frictionally engaging the computer mouse 1 to selectively couple the base member 12 to the computer mouse 1. The receiving aperture 16 is designed for permitting the computer mouse 1 to function when the base member 12 is coupled to the computer mouse 1.

A base layer 18 is coupled to a bottom surface 20 of the base member 12. The base layer 18 is designed for abutting against a support surface whereby the base layer 18 slides across the support surface when the computer mouse 1 is being moved by the user. The base layer 18 comprises a low friction material. The low friction material is designed for sliding easily across the support surface to minimize resistance to the movement of the computer mouse 1 when the computer mouse 1 is being used by the user.

The cushion member 14 is arcuate whereby the cushion member 14 extends between opposing side edges 22 of the base member 12. The cushion member 14 is designed for supporting the wrist of the user from a variety of angles of the wrist with respect to the computer mouse 1.

The cushion member 14 is positioned adjacent a rear edge 24 of the base member 12. The cushion member 14 is positioned in spaced relationship from the receiving aperture 16 of the base member 12 to allow a heel of the hand of the user to be positioned between the computer mouse 1 and the cushion member 14 for greater comfort when the user is using the computer mouse 1.

The cushion member 14 comprises a compressible material, such as, but no limited to, foam rubber. The compressible material is designed for conforming to the wrist of the user to provide support and comfort for the wrist of the user when the user is using the computer mouse 1.

In use, the user inserts the computer mouse 1 into the receiving aperture 16 of the base member 12 and ensures the base member 12 is coupled to the computer mouse 1. The user then places a hand on the computer mouse 1 with the wrist of the user positioned on the cushion member 14. The base member 12 and the cushion member 14 are moved with the mouse to provide continuous support for the wrist of the user and to inhibit the wrist of the user being damaged from extended use of the computer mouse 1.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A wrist support device for supporting a wrist of a user when the user is using a computer mouse, the wrist supporting device comprising:

a base member being adapted for being selectively coupled to the computer mouse;

a cushion member being coupled to said base member such that said cushion member extends upwardly from said base member, said cushion member being adapted for supporting the wrist of the user to reduce the stress on the wrist of the user when a hand of the user is positioned on the computer mouse;

said base member comprising a receiving aperture, said receiving aperture extending through said base member, said receiving aperture being adapted for receiving the computer mouse such that said base member extends around a periphery of a lower portion of the computer mouse, said base member being adapted for frictionally engaging the computer mouse to selectively couple said base member to the computer mouse, said receiving aperture being adapted for permitting the computer mouse to function when said base member is coupled to the computer mouse;

a base layer being coupled to a bottom surface of said base member, said base layer being adapted for abutting against a support surface such that said base layer slides across the support surface when the computer mouse is being moved by the user;

said base layer comprising a low friction material, said low friction material being adapted for sliding easily across the support surface to minimize resistance to the movement of the computer mouse when the computer mouse is being used by the user;

said cushion member being arcuate such that said cushion member extends between opposing side edges of said base member, said cushion member being adapted for supporting the wrist of the user from a variety of angles of the wrist with respect to the computer mouse;

said cushion member being positioned adjacent a rear edge of said base member, said cushion member being positioned in spaced relationship from said receiving aperture of said base member to allow a heel of the hand of the user to be positioned between the computer mouse and said cushion member for greater comfort when the user is using the computer mouse;

said cushion member comprising a compressible material, said compressible material being adapted for conforming to the wrist of the user to provide support and comfort for the wrist of the user when the user is using the computer mouse; and said base member extending continuously about said receiving aperture to encircle the periphery of the computer mouse when the computer mouse is positioned in said receiving aperture, said base member being for inhibiting the computer mouse from inadvertently exiting said receiving aperture when the computer mouse is in use.

* * * * *